(12) United States Patent
Teruyama

(10) Patent No.: US 6,772,318 B1
(45) Date of Patent: Aug. 3, 2004

(54) BYPASS CONTROL CIRCUIT

(75) Inventor: Tatsuo Teruyama, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 710 days.

(21) Appl. No.: 09/667,500

(22) Filed: Sep. 22, 2000

(30) Foreign Application Priority Data

Sep. 24, 1999 (JP) .......................................... 11-271179

(51) Int. Cl.⁷ ............................................. G06F 9/38
(52) U.S. Cl. ..................................... 712/218; 712/225
(58) Field of Search ................................ 712/218, 216, 712/221, 222, 223, 225, 23, 24, 26; 711/138, 139, 140

(56) References Cited

U.S. PATENT DOCUMENTS

| | | | |
|---|---|---|---|
| 4,189,770 A | * | 2/1980 | Gannon et al. ............. 711/138 |
| 4,371,956 A | | 2/1983 | Maeda et al. |
| 5,043,868 A | * | 8/1991 | Kitamura et al. ........... 712/218 |
| 5,778,248 A | | 7/1998 | Leung |
| 5,805,852 A | | 9/1998 | Nakanishi |
| 5,872,986 A | | 2/1999 | Heeb |
| 6,052,307 A | | 4/2000 | Huber et al. |
| 6,266,766 B1 | * | 7/2001 | O'Connor ................... 712/217 |
| 6,279,100 B1 | * | 8/2001 | Tremblay et al. ............. 712/24 |

FOREIGN PATENT DOCUMENTS

| | | | | |
|---|---|---|---|---|
| JP | 59123937 A | * | 7/1984 | ............. G06F/9/38 |
| JP | 59177654 A | * | 10/1984 | ............. G06F/9/38 |
| JP | 59177655 A | * | 10/1984 | ............. G06F/9/38 |
| JP | 60178539 A | * | 9/1985 | ............. G06F/9/38 |

\* cited by examiner

*Primary Examiner*—Henry W. H. Tsai
(74) *Attorney, Agent, or Firm*—Oblon, Spivak, McClelland, Maier & Neustadt, P.C.

(57) ABSTRACT

There is disclosed a bypass control method in which data can be set on a source register of an instruction to be executed on an instruction bus in a short time. A bypass control apparatus of the present invention includes a plurality of comparators for comparing the outputs of flip-flops for transferring a register number of a destination register on the instruction bus with each other. By utilizing a comparison result of a comparator for comparing the comparison results of these comparators with the register number of the source register on the instruction bus, a bypass path of data inputted to the source register of the instruction to be executed can be set in a short time. When a plurality of agreements are detected, the bypass path is set on the basis of the output of the flip-flop on a first stage side, so that it is possible to avoid a disadvantage inputting old data to the source register by mistake.

14 Claims, 7 Drawing Sheets

FIG. 1
Background Art

Op : OPERATION CODE
Rd : DESTINATION OPERAND NUMBER
Rs : SOURCE REGISTER NUMBER 1
Rt : SOURCE REGISTER NUMBER 2

(1) SLL R1,R2,R3
(2) XOR R1,R2,R3
(3) ADD R1,R2,R3
(4) SUB R4,R1,R5

F I G. 7

|  | T1 | T2 | T3 | T4 | T5 | T6 | T7 |
|---|---|---|---|---|---|---|---|
| SLL R1,R2,R3 | A | B | C | D |  |  |  |
| XOR R1,R2,R3 |  | A | B | C | D |  |  |
| ADD R1,R2,R3 |  |  | A | B | C | D |  |
| SUB R4,R1,R5 |  |  |  | A | B | C | D |

F I G. 8

F I G. 9  PRESENT INVENTION

F I G. 10

BYPASS CONTROL CIRCUIT

CROSS REFERENCE TO RELATED APPLICATIONS

The subject application is related to subject matter disclosed in Japanese Patent Application No. H11-271179 filed on Sep. 24, 1999 in Japan to which the subject application claims priority under Paris Convention and which is incorporated herein by reference. This application is also related to U.S. application Ser. Nos. 09/487,763, 09/667,500, and 10/134,373.

BACKGROUND OF THE INVENTION

1. Field of the Invention

The present invention relates to a technique of disposing a bypass path to obtain a content of a source register content used to instruction execution at a high speed during execution of an instruction on an instruction bus, particularly to a bypass control circuit for use inside a processor.

2. Related Background Art

Figure 1:
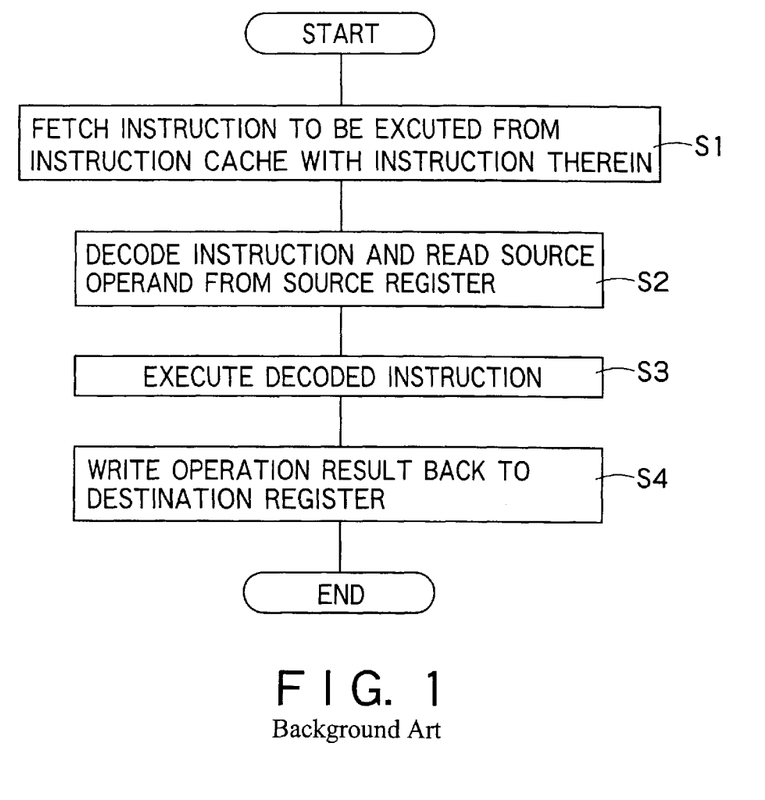
FIG. 1 is a flowchart showing an outline of pipeline processing.

In a recent processor, in order to enhance a processing efficiency, an instruction is subdivided into a plurality of stages and executed in parallel, that is, a so-called pipeline processing is performed in many cases. FIG. 1 is a flowchart showing an outline of the pipeline processing.

First, the instruction to be executed is fetched from an instruction cache in which instructions are stored (step S1). Subsequently, the instruction is decoded, and a source operand is read from a source register (step S2).

Figure 2:
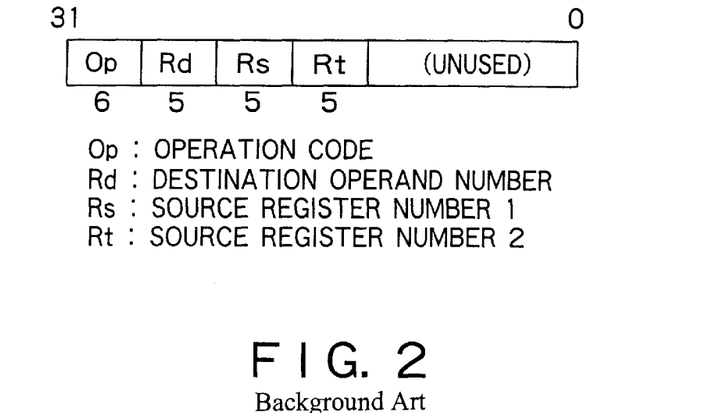
FIG. 2 is a diagram showing a format of an instruction executed by a processor.

Here, the instruction executed by the processor is, as shown in FIG. 2, constituted of an operation code Op indicating an instruction type, a destination operand Rd as a storage destination of an instruction execution result, and source operands Rs, Rt for use in executing the instruction.

In the following, a register storing the destination operand is called a destination register, and a register storing the source operand is called a source register. The destination register or the source register is stored in a register file 33 in the processor.

After the source register is read from the register file 33 in the step S2, the decoded instruction is executed (step S3). Subsequently, an operation result is written back to the destination register (step S4).

Since cycle number required for instruction execution differs in accordance with the instruction type, in the step S4, time adjustment is performed by transferring the instruction execution result by a plurality of flip-flops.

In the step S2, the content of the corresponding source register is read from the register file. When a destination register number of the preceding instruction is the same as a source register number, the operation of the preceding instruction ends, and the result has already been obtained but has not been written to the register file yet, that is, at a time when writing has not been finished for time adjustment, the content of the destination register is bypassed to the source register and the instruction execution is performed.

Figure 3:
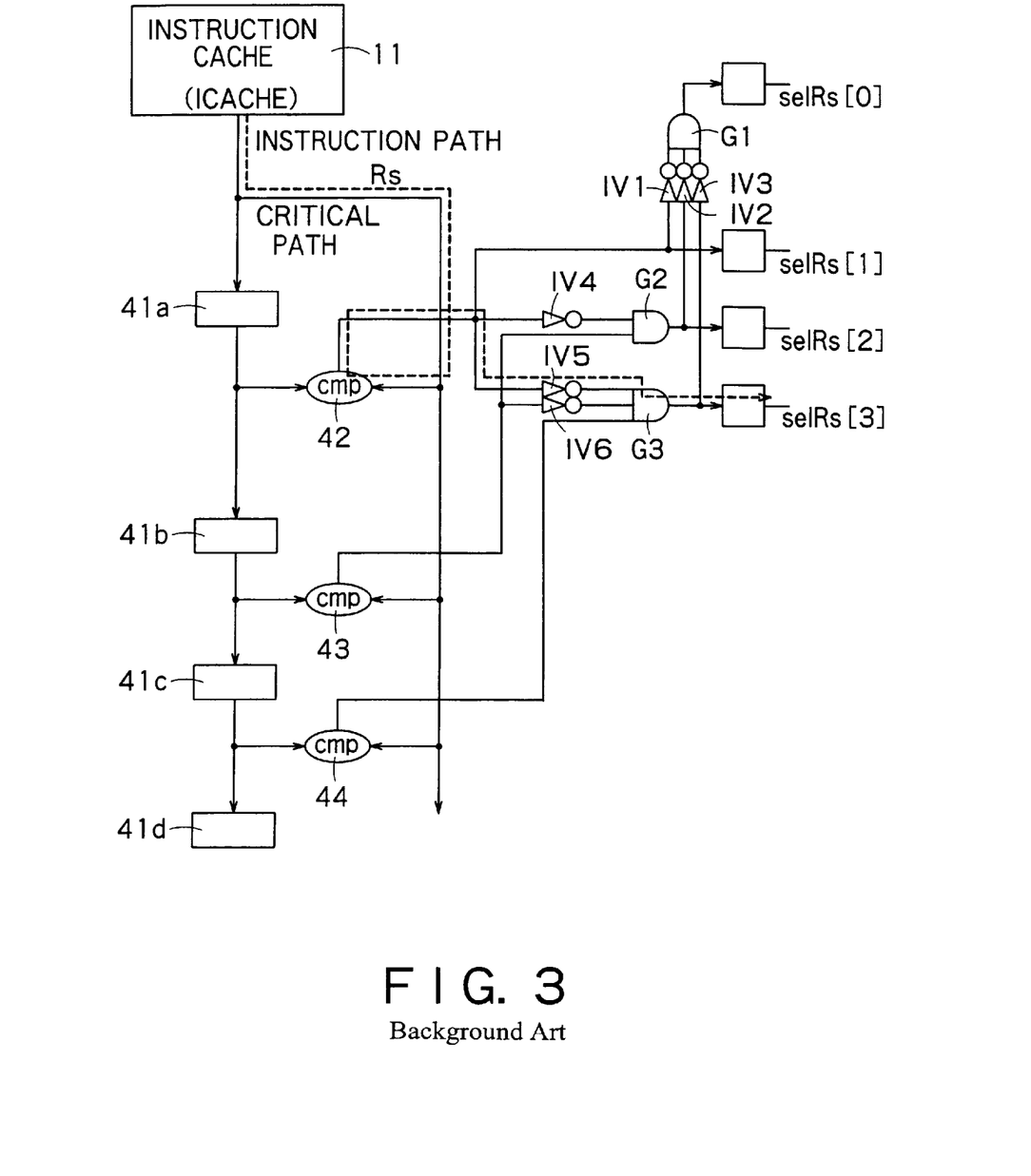
FIG. 3 is a schematic block diagram of a conventional bypass control circuit.

FIG. 3 is a schematic block diagram of a conventional bypass control circuit for controlling such bypass. The bypass control circuit of FIG. 3 shows an example in which the instruction outputted from an instruction cache is executed through the subdivided four stages A to D, and the final execution result is written back to the destination register in the register file 33 shown in FIG. 4.

Moreover, the stage from which the final result is obtained differs by the instruction type. With simple instructions such as addition and subtraction, the operation result is obtained at the end of A stage. For a complicated shift instruction, the operation result is determined at the end of B stage, and a result of a load store instruction is obtained at the end of C stage. For instructions requiring long calculation time, such as multiplication instruction of 32 bits, the result cannot be obtained until the end of D stage. In this manner, the stage from which the final result is obtained differs with the instruction, but timing of returning data to the register file is set to be the same. Therefore, the final operation result is obtained with respect to the instruction whose result is obtained in a particularly short time, but a time zone in which writing is not performed yet is generated in the register file. When the subsequent instruction refers to the final operation result in this time zone, the data is transferred by a bypass.

In the bypass control circuit of FIG. 3, each of the A to D stages is provided with flip-flops 41a to 41d and comparators 42 to 44. Each of the flip-flops 41a to 41d successively transfers the register number of the destination register Rd outputted from an instruction cache 11 in synchronization with a system clock of the processor.

The comparator 42 compares an output of the flip-flop 41a of the A stage with an output of the register number of the source register outputted from the instruction cache 11, and outputs a comparison result. The comparator 43 compares an output of the flip-flop 41b of the B stage with the output of the register number of the source register outputted from the instruction cache 11, and outputs the comparison result. The comparator 44 compares an output of the flip-flop 41c of the C stage with an output of the register number of the source register outputted from the instruction cache 11, and outputs the comparison result.

By inputting the comparison results of the comparators 42 to 44 to inverters IV1 to IV6 and AND gates G1 to G3 and performing a logical operation, the final bypass path is determined.

Moreover, when the plurality of comparators 42 to 44 detect match, prioritizing is performed, and the output of the flip-flop corresponding to the stage close to the instruction cache 11 is preferentially utilized as the source operand of the instruction to be executed next.

This corresponds to a case in which the destination registers of a plurality of preceding instructions are the same. In this case, the operation result of the latest instruction has to be utilized as the source operand.

In a processor employing a super scaler or a processor having many pipeline states, since the number of flip-flops as a bypass object is large, a scale of a gate circuit for performing the prioritizing is enlarged. Specifically, since the number of gate stages increases, much time is required for instruction execution processing.

In an ordinary processor, since it takes relatively much time to fetch the instruction from the instruction cache, a dashed line path of FIG. 3, that is, a path for performing comparison of the register number from the instruction bus and performing the prioritizing easily becomes a critical path on timing. Moreover, by the presence of such critical path, there is a possibility that a processor operation frequency is limited.

SUMMARY OF THE INVENTION

The present invention has been developed in consideration of this respect, and an object thereof is to provide a bypass control circuit in which data can be set on a source register of an instruction to be executed on an instruction bus in a short time.

To attain the aforementioned object, there is provided a bypass control circuit comprising:

a plurality of flip-flops, cascade-connected on an instruction bus, for successively transferring a register number of a destination register indicating an instruction storage destination in synchronization with a system clock;

first comparison means for comparing the outputs of at least two flip-flops among the plurality of flip-flops with each other;

second comparison means for comparing the register number of the source register of the instruction to be executed on the instruction bus with respective outputs of at least part of the plurality of flip-flops; and bypass path setting means for setting a bypass path of data inputted to the source register of the instruction to be executed on the instruction bus on the basis of the comparison results of the first and second comparison means.

According to the present invention, since the first comparison means is disposed to compare the outputs of two arbitrary flip-flops with each other among the plurality of flip-flops for successively transferring the register number of the destination register, the bypass path of the data inputted to the source register of the instruction to be executed can be set in a short time by utilizing the comparison result.

Moreover, when the first comparison means detects a plurality of equality, the bypass path is set on the basis of the output of the flip-flop on a first stage side, and it is possible to avoid a disadvantage that old data is inputted to the source register by mistake.

DETAILED DESCRIPTION OF THE PREFERRED EMBODIMENTS

The bypass control circuit according to the present invention will concretely be described hereinafter with reference to the drawings. An example for disposing the bypass control circuit inside a processor will be described hereinafter.

Figure 4:
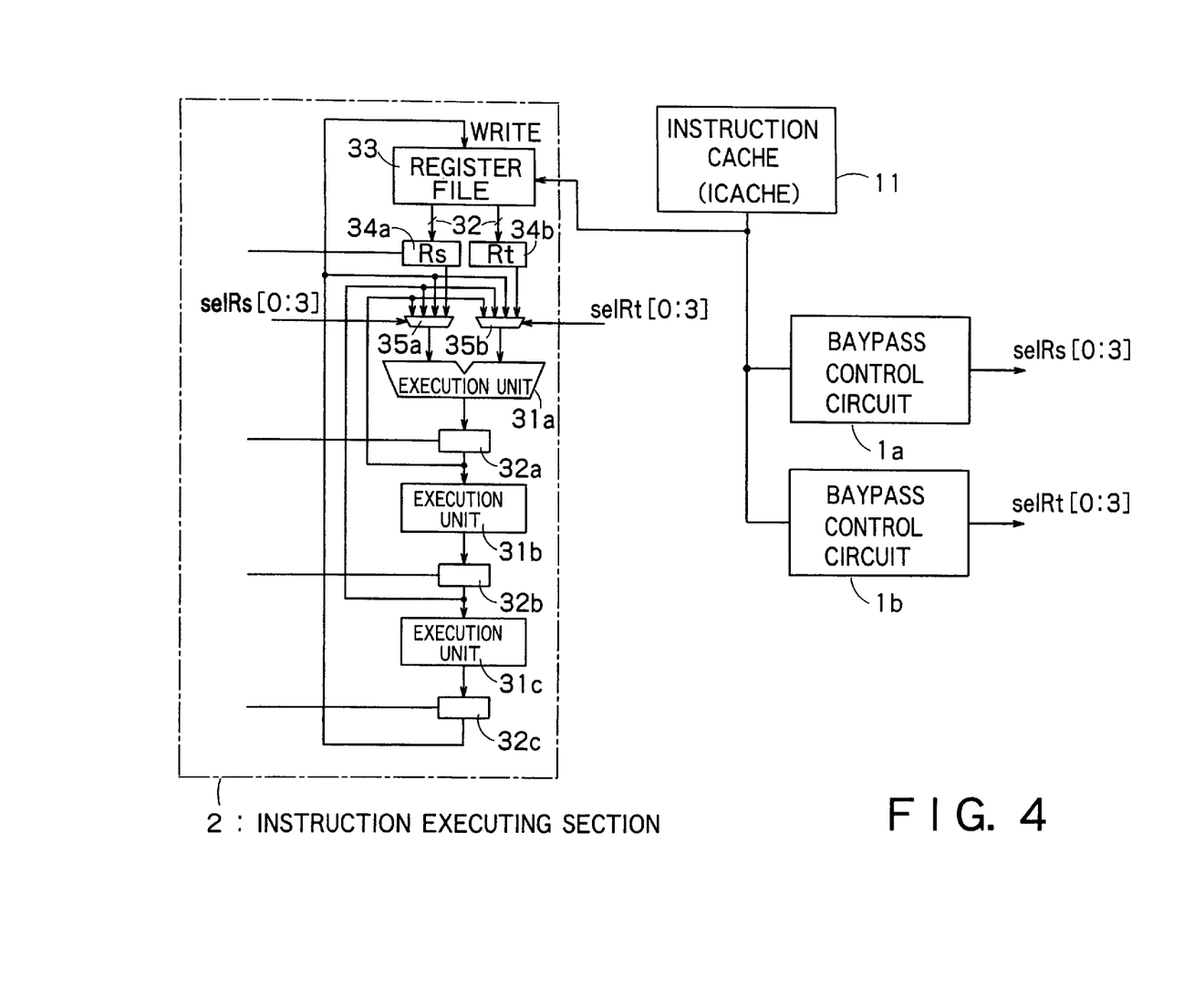
FIG. 4 is a block diagram showing a schematic constitution of a processor including the bypass control circuit of the present invention.
Figure 5:
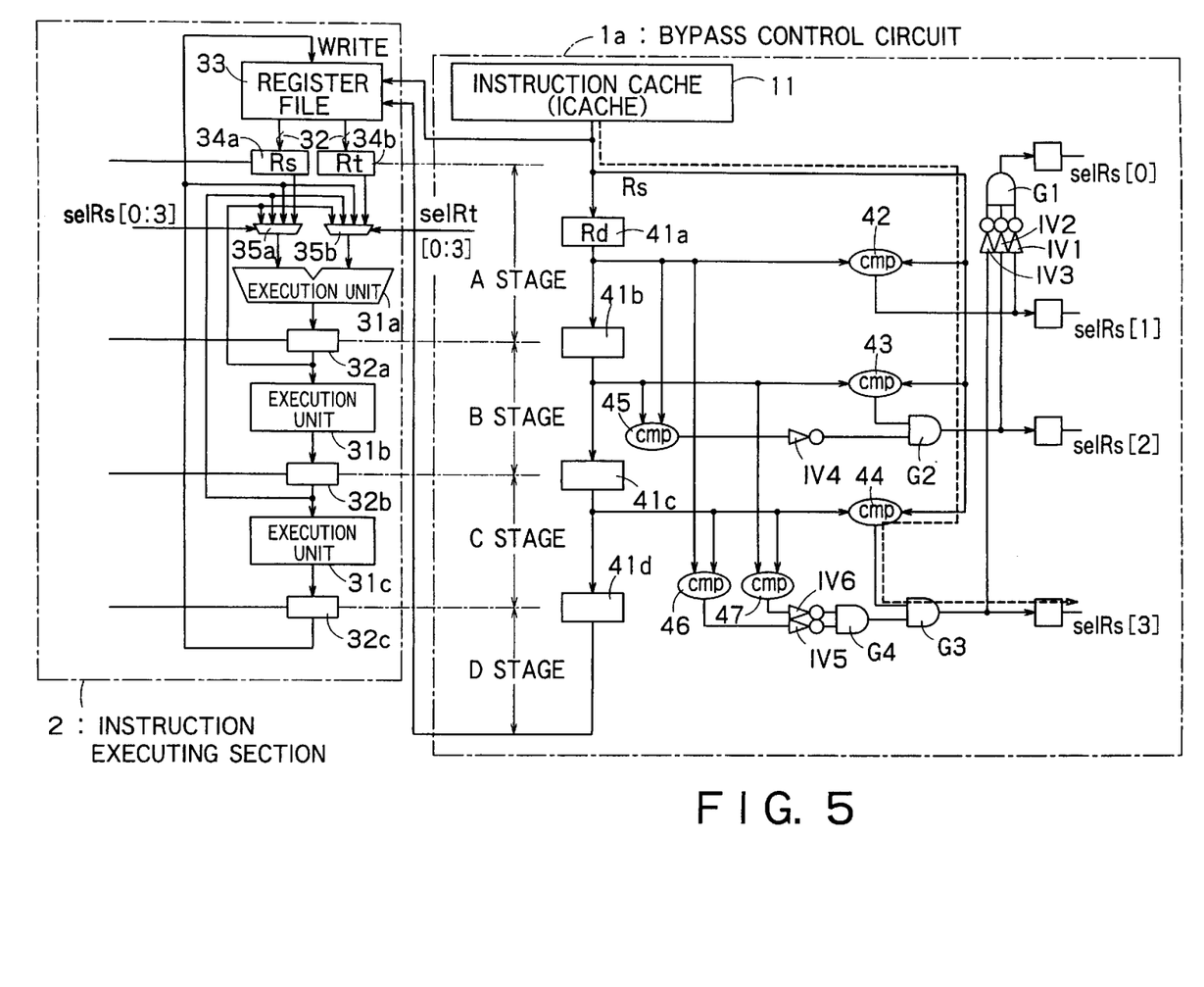
FIG. 5 is a circuit diagram showing a detailed constitution of the bypass control circuit of FIG. 4.

FIG. 4 is a block diagram showing a schematic constitution of the processor including the bypass control circuit according to the present invention, and FIG. 5 is a circuit diagram showing a detailed constitution of the bypass control circuit of FIG. 4. The bypass control circuit of the present embodiment is connected to an instruction executing section to control a flow of data among stages in the instruction executing section.

Figure 6:
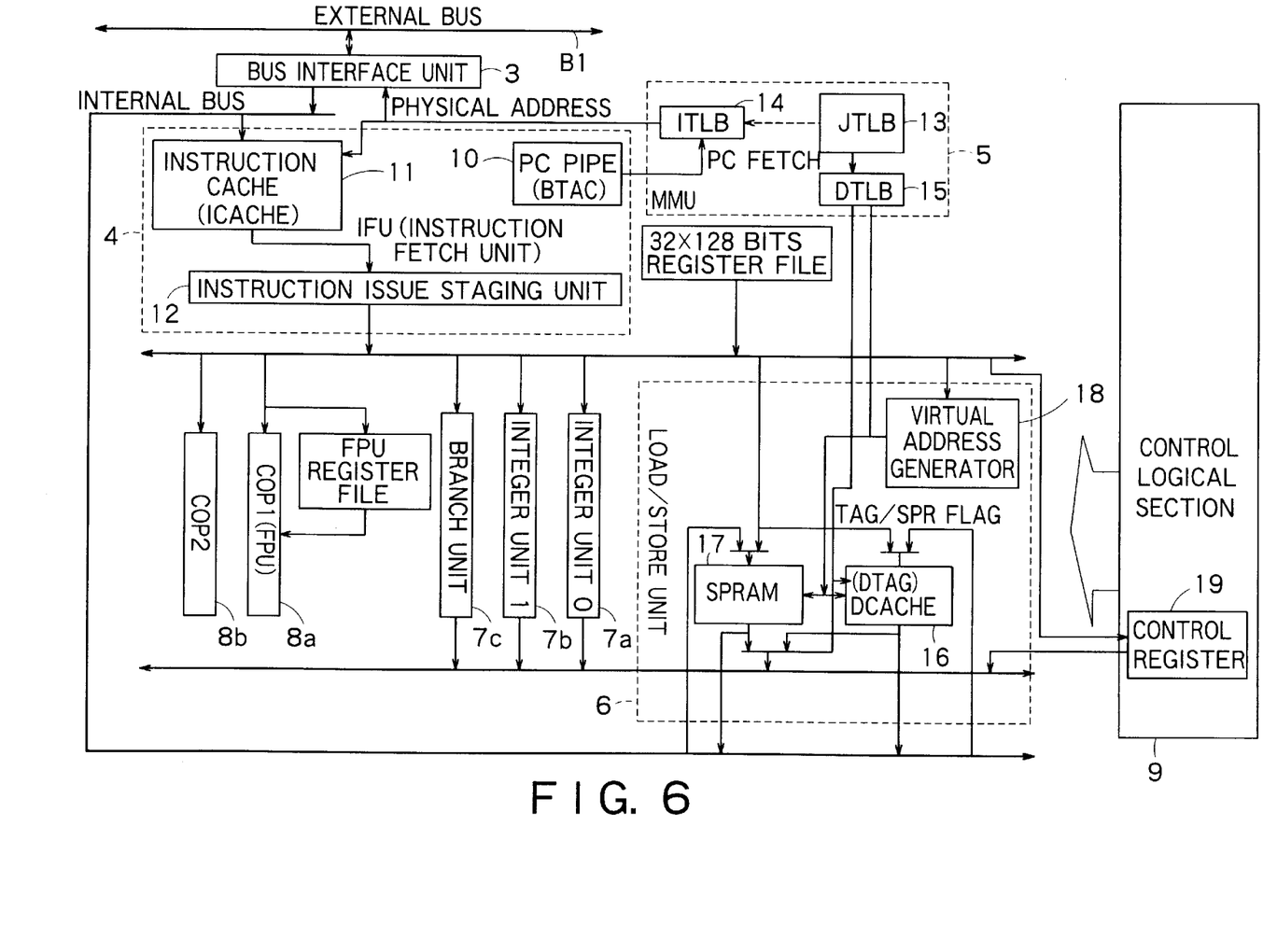
FIG. 6 is a block diagram showing the entire constitution of the processor including the bypass control circuit of FIG. 5.

FIG. 6 is a block diagram showing the entire constitution of the processor including bypass control circuits 1a, 1b of FIG. 5. The entire constitution of the processor of FIG. 6 will briefly be described before describing the constitutions of the bypass control circuits 1a, 1b of FIG. 5.

The processor of FIG. 6 is provided with a bus interface unit (BIU) 3 connected to an external bus B1, an instruction fetch unit (IFU) 4 for fetching an instruction to be executed by the processor, a memory management unit (MMU) 5 for converting a virtual address to a physical address, a load/store unit (LSU) 6 for executing the instruction relating to load/store, a plurality of executing units 7a, 7b, 7c for executing instructions other than the load/store instruction, floating point units (FPU) 8a, 8b for performing a floating point operation, and a control logical section 9 for controlling respective blocks in the processor.

The IFU 4 includes a PC pipe 10 for referring to BTAC for storing a branch destination of a branch instruction, and the like to generate a program counter (PC), an instruction cache (ICACHE) 11 for temporarily storing the instruction, and an instruction issuance staging unit 12 for selecting the executing unit to identify an instruction type and execute the identified instruction. The bypass control circuits 1a, 1b and instruction executing section 2 of FIG. 5 are disposed inside the instruction issuance staging unit 12.

The MMU 5 includes three translation lookaside buffers (TLBs) for converting the virtual address to the physical address. Address conversion information required by the processor, such as a physical page number and memory protection information, are written into TLBs. The MMU 5 performs the conversion to the physical address on the basis of the information.

The three TLBs in the MMU 5 include a joint translation lookaside buffer (JTLB) 13, an instruction translation lookaside buffer (ITLB) 14, and a data translation lookaside buffer (DTLB) 15.

The ITLB 14 and DTLB 15 are generically called micro TLB. The ITLB 14 is an exclusive TLB directly connected to a datapath of an instruction virtual address. The DTLB 15 is an exclusive TLB directly connected to the datapath of a data virtual address. The number of entries of these TLBs is small, but address conversion is performed at a high speed. A part of a conversion table generated by the JTLB 13 is copied to the ITLB 14 or the DTLB 15 as occasion demands.

The JTLB 13 is controlled by software, while coherency of the micro TLBs and JTLB is maintained by hardware. When no conversion table exist in the JTLB 13, a microprocessor issues an exception. An exception handler searches the corresponding page from a page table on an OS memory, and writes the page into the JTLB 13.

The LSU 6 includes a data cache (DCACHE) 16 for temporarily storing read/write data with respect to an external memory, a scratch pad RAM (SPRAM) 17 for use in specific objects other than the cache, and an address generator (virtual address computation) 18 for generating the virtual address necessary for accessing the DCACHE 16 and SPRAM 17.

The control logical section 9 controls the respective blocks in the processor. A control register 19 is disposed in the control logical section 9.

A constitution of the instruction executing section 2 shown on the left side of FIGS. 4 and 5 will next be described. The instruction executing section 2 is provided with execution units 31a to 31c and flip-flops 32a to 32c for each stage. An output of the flip-flop 32c of the final stage is written back to a destination register Rd in a register file 33.

The register file 33 outputs contents of source registers Rs, Rt on the basis of respective address values of the source registers Rs, Rt outputted from the instruction cache 11. Moreover, the register file 33 stores the output of the flip-flop 32c of the final stage to a write address of the destination register Rd outputted from the instruction cache 11.

Data in the source registers Rs, Rt outputted from the register file 33 are latched by flip-flops 34a, 34b, respectively.

Selectors 35a, 35b are disposed in the subsequent stage of the flip-flops 34a, 34b. The selector 35a selects either one from the data to be written back to the destination register Rd being transferred and the data in the source register Rs latched by the flip-flop 34a. Similarly, the selector 35b selects either one from the data to be written back to the destination register being transferred and the data in the source register Rt latched by the flip-flop 34b.

The selector 35a performs selection on the basis of a logic of output signal selRs[0:3] of the bypass control circuit 1a, and the selector 35b performs selection on the basis of a logic of output signal selRt[0:3] of the bypass control circuit 1b.

The outputs of the selectors 35a, 35b are inputted to the execution unit 31a, and the instruction outputted from the instruction cache 11 is executed. The operation result of the execution unit 31a is inputted to the flip-flop 32a, and then inputted to the next stage execution unit 31b so that the instruction is executed. Subsequently, similarly, the instruction execution is continuously performed to the D stage.

The number of cycles required for the instruction execution differs with complicated operations such as a multiplication operation instruction and a division instruction and with simple operations such as an addition/subtraction instruction, but in the processor of FIG. 6, the number of cycles from the start of instruction execution until writing-back to the register file 33 is all set in common.

For example, when the simple instruction execution whose result is obtained in one machine cycle is performed, the operation result obtained by the execution unit 31a in the A stage is transferred to the D stage and written to the register file 33. On the other hand, when the complicated instruction execution is performed, a plurality of stages (up to the D stage at maximum) are utilized to perform the operation, and subsequently the result is written to the register file 33. Therefore, irrespective of the instruction type, the number of cycles until the writing back to the register file 33 can be set in common.

The output of the flip-flop 32c of the D stage as the final stage is written back to the storage position in the register file 33 corresponding to the instruction destination register number.

The bypass control circuits 1a, 1b of the present embodiment will next be described. FIG. 5 shows only the constitution of the bypass control circuit 1a, but the bypass control circuit 1b is similarly constituted.

The bypass control circuit 1a of FIG. 5 is characterized in that it can be judged in a short time whether or not the register number of the source register outputted from the instruction cache 11 agrees with the register number of the destination register Rd being transferred among the respective stages. By this characteristic, the data to be inputted to the source register can quickly be determined, and processing speed can be enhanced.

In FIG. 5, constituting parts in common with those of the conventional bypass control circuit shown in FIG. 3 are denoted with alike reference numerals, and different respects will mainly be described hereinafter.

In addition to the constitution of FIG. 3, the bypass control circuit 1a of FIG. 5 is provided with a plurality of comparators 45 to 47 for comparing the outputs of flip-flops 41a to 41c for transferring the register number of the destination register Rd outputted from the instruction cache 11 with one another.

Here, the comparators 45 to 47 correspond to first comparison means, comparators 42 to 44 correspond to second comparison means, and AND gates G1 to G4 and inverters IV1 to IV6 correspond to bypass path setting means. Moreover, the selectors 35a, 35b of FIG. 5 correspond to selection means.

The comparator 45 compares the output of the flip-flop 41a of the A stage with the output of the flip-flop 41b of the B stage. Moreover, the comparator 46 compares the output of the flip-flop 41a of the A stage with the output of the flip-flop 41c of the C stage. Furthermore, the comparator 47 compares the output of the flip-flop 41b of the B stage with the flip-flop 41c of the C stage.

The output of the comparator 45 is inverted by the inverter IV4. The output of the inverter IV4 indicates a low level when agreement is detected by the comparator 45.

Outputs of the comparators 46, 47 are inputted to the inverters IV5, IV6, inverted, and then inputted to the AND gate G4. An output of the AND gate G4 indicates a low level when agreement is detected by either one of the comparators 46, 47.

Similarly as the circuit of FIG. 3, the comparator 43 compares the output of the flip-flop 41b of the B stage with the register number of the source register outputted from the instruction cache 11. When the output of the inverter IV4 indicates the low level, that is, when the outputs of the respective flip-flops 41a, 41b of the A and B stages agree with each other, the AND gate G2 indicates a low level.

Similarly as the circuit of FIG. 3, the comparator 44 compares the output of the flip-flop 41c of the C stage with the register number of the source register outputted from the instruction cache 11. When the output of the AND gate G4 indicates the low level, that is, when the outputs of the respective flip-flops 41c, 41d of the B and C stages agree with each other, the AND gate G3 indicates a low level.

In this manner, the comparators 42 to 44 compare the output of the instruction cache 11 with the outputs of the respective flip-flops 41a to 41c, and the comparators 45, 46, 47 compare the outputs of the respective flip-flops 41a to 41c with one another. Moreover, comparison processing of the comparators 41a to 41c is performed at the same timing as the comparison processing of the comparators 45, 46, 47.

After output selRs[0] of the AND gate G1, output selRs[1] of the comparator 42, output selRs[2] of the AND gate G2, and output selRs[3] of the AND gate G3 are once received by the flip-flop, a selection object of the selector 35a is determined by an output value of the flip-flop at the next clock.

Specifically, when selRs[0]=1, the selector 35a selects the data in the source register from the register file 33. When selRs[1]=1, it selects the output of the flip-flop 32a of the B stage. When selRs[2]=1, it selects the output of the flip-flop 32b of the C stage is selected. When selRs[3]=1, it selects the output of the flip-flop 32c of the D stage.

As omitted from FIG. 5, similarly as the bypass control circuit 1a of FIG. 5, the bypass control circuit 1b of FIG. 4 compares the register number of the destination register Rd being transferred with the register number of the source register Rt from the instruction cache 11, and outputs signal selRt [0:3] indicating the comparison result.

Figure 7:
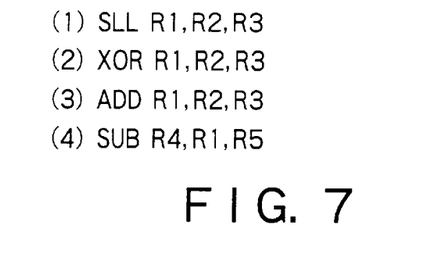
FIG. 7 is a diagram showing one example of an instruction string executed by the processor.

FIG. 7 is a diagram showing one example of an instruction string to be executed by the processor. FIG. 7 shows an example in which register number R1 of source register Rs of SUB instruction to be executed for a fourth time agrees with the register number R1 of the destination register Rd of first to third instructions to be executed in advance.

An processing operation of the bypass control circuits 1a, 1b of FIG. 5 will be described hereinafter by way of an example in which the instruction string of FIG. 7 is executed.

Figure 8:
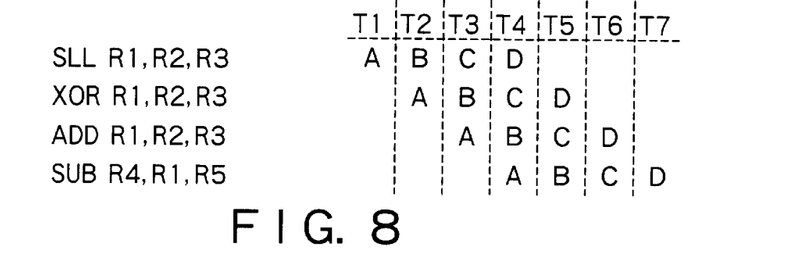
FIG. 8 is a diagram showing each stage processing state when the instruction string of FIG. 7 is executed.

The processor of the present embodiment subdivides the instruction string of FIG. 7 to perform pipeline processing. FIG. 8 is a diagram showing each stage processing situation when the instruction string of FIG. 7 is executed. As shown in FIG. 8, a first SLL instruction is executed in a T1 to T4 cycle, and a second XOR instruction is executed in a T2 to T5 cycle. Moreover, a third ADD instruction is executed in a T3 to T6 cycle, and a fourth SUB instruction is executed in a T4 to T7 cycle.

The bypass control circuits 1a, 1b of FIG. 5 perform processing at a timing one cycle earlier than a timing at which the execution units 31a to 31c execute the instruction. This is because for the instruction outputted from the instruction cache 11, the data in the source register to be executed has to be determined before the start of execution processing in the A stage.

For example, in the example of FIG. 7, for the first SLL instruction, the processing of the bypass control circuits 1a, 1b of FIG. 5 needs to be completed until T0 cycle. Similarly, the bypass path needs to be determined until T1 cycle for the second XOR instruction, until T2 cycle for the third ADD instruction, and until T3 cycle for the fourth SUB instruction.

A case in which the fourth SUB instruction is outputted from the instruction cache 11 at the T3 cycle will be described hereinafter. Since the register number of the source register Rs of the SUB instruction agrees with the register number of the destination register Rd of the first to third instructions, the comparators 42 to 47 of FIG. 5 all output a high level indicating the agreement. Therefore, the outputs of the inverter IV4 and AND gate G4 indicate a low level, and only selRs[1] among selRs[0:3] indicates the high level.

Therefore, in the example of FIG. 7, the data in the destination register Rd as the execution result of the third ADD instruction is used as the source register Rs of the fourth SUB instruction to be executed next.

In this manner, in the bypass control circuits 1a, 1b of FIG. 5, when the comparators 45 to 47 for comparing the outputs of the flip-flops 41a to 41d with one another detect agreement, a bypass object is limited by disabling the comparison result for a rear stage side of the flip-flops 41a to 41d subjected to the comparison from the bypass object. Thereby, the bypass path can be searched in a short time.

Figure 9:
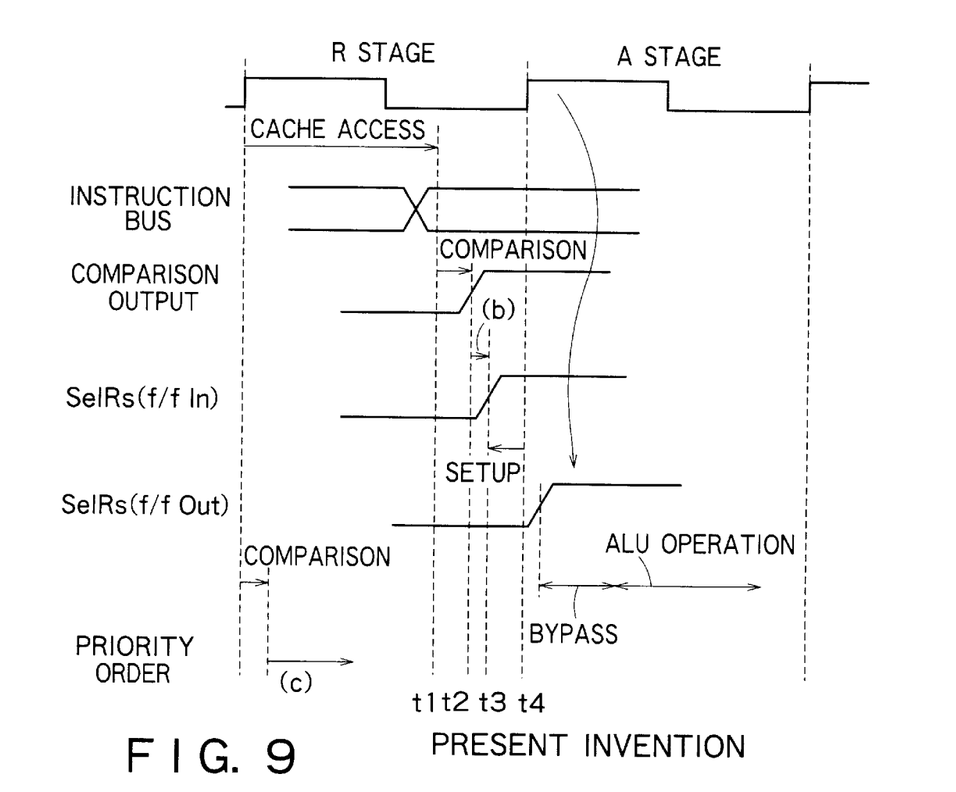
FIG. 9 is a timing chart of the bypass control circuit of the present embodiment.

FIG. 9 is a timing chart of the bypass control circuits 1a, 1b of the present embodiment. As shown in FIG. 9, the comparison processing in the respective comparators 42 to 44 of the bypass control circuits 1a, 1b of FIG. 5 starts at time t1 when the data on the instruction bus as the output of the instruction cache 11 is defined, and the comparison results are outputted from the comparators 42 to 44 at time t2. Subsequently, the logic of the selected signal selRs[0:3] inputted to the selectors 35a, 35b is defined at time t3.

On the other hand, since the flip-flops 41a to 41d are defined early in the cycle time (just after the rising edge of the system clock), the outputs of the comparators 45 to 47 are defined at a sufficiently early timing. Moreover, the subsequent outputs of IV4 to IV6 and G4 are also defined at the sufficiently early timing, and these are not on a critical path on timing.

After selRs[0:3] is inputted to the flip-flop (not shown), and latched at time t4 of the rising edge of the system clock is inputted, the signal is inputted to the selector 35a of FIG. 5, and selection of the bypass path.

For time t1 to t3 of FIG. 9, the processing needs to be performed within one cycle of the system clock. Moreover, a time difference between time t3 and t4 needs to be equal to or longer than a setup time of a flip-flop (not shown) for latching selRs[0:3].

Specifically, the cycle time of the system clock needs to be longer than time obtained by combining access time to the instruction cache 11, comparison processing time of the comparators 42 to 44 of FIG. 5, logical operation time of gate circuits G1 to G3 of FIG. 5, and setup time of the flip-flop for latching selRs[0:3].

Figure 10:
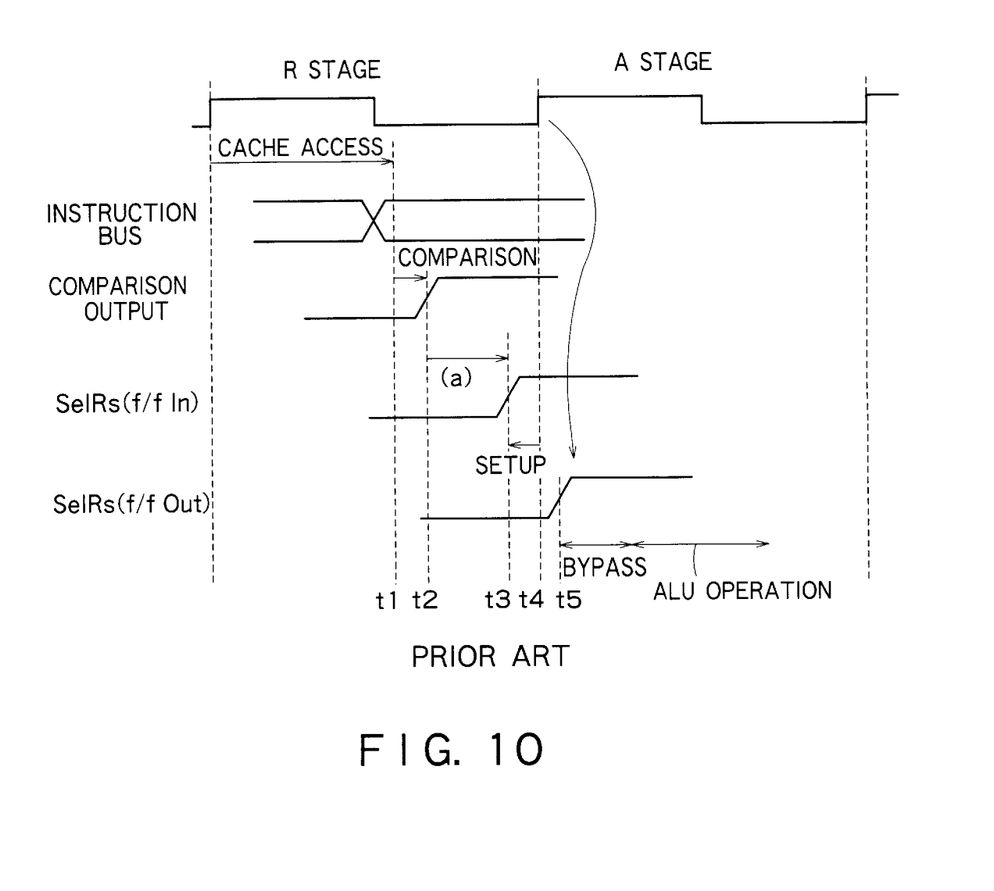
FIG. 10 is a timing chart of the conventional bypass control circuit shown in FIG. 3.

On the other hand, FIG. 10 is a timing chart of the conventional bypass control circuits 1a, 1b shown in FIG. 3. As seen from comparison between FIGS. 9 and 10, in the conventional bypass control circuits 1a, 1b, since the logical operation time of the gate circuit, that is, time of t2 to t3 is longer than that of the present embodiment, the cycle time of the processor cannot be shortened very much. Conversely, in the present embodiment, since a scale of the gate circuit can be minimized, the logical operation time can be shortened, the cycle time of the processor can be shorter than in the conventional art, and an operation frequency of the system clock of the processor can be raised.

In this manner, in the present embodiment, the register numbers of the destination register Rd after instruction which is already executed and transferred among the stages are compared with one another among the respective stages, and on the basis of this comparison result, and a result of comparing the register number of the source register of the instruction to be executed with the destination register Rd of each stage, the bypass path of the source register is determined. Therefore, the number of levels of the gate circuit required for the comparison processing can be reduced, and the time required for determining the bypass path can be shortened as compared with the conventional art. Consequently, so much more for that, the operation frequency of the system clock of the processor can be raised.

In the aforementioned embodiment, the example in which by division into four stages the pipeline processing is performed has been described, but the number of stages of the pipeline processing is not limited to four. Moreover, in FIG. 5, the example in which the inverters IV1 to IV7 and AND gates G1 to G4 constitute the gate circuit has been described, but the type of logical elements constituting the gate circuit and the circuit constitution are not particularly limited.

Moreover, in the aforementioned embodiment, the example in which only one pipeline is disposed has been described, but the number of pipelines is not particularly limited.

What is claimed is:

1. A bypass control circuit comprising:

a plurality of flip-flops, cascade-connected on an instruction bus, for successively transferring a register number of a destination register indicating an instruction storage destination in synchronization with a system clock;

first comparison means for comparing the outputs of at least two flip-flops among said plurality of flip-flops with each other;

second comparison means for comparing the register number of the source register of the instruction to be executed on the instruction bus with respective outputs of at least part of said plurality of flip-flops; and bypass path setting means for setting a bypass path of data inputted to the source register of the instruction to be executed on the instruction bus on the basis of the comparison results of said first and second comparison means.

2. The bypass control circuit according to claim 1 wherein when said first and second comparison means detect the agreement of two or more sets, said bypass path setting means sets said bypass path on the basis of an output of the flip-flop on a side close to a first stage.

3. The bypass control circuit according to claim 2 wherein when said first comparison means detects the agreement, said bypass path setting means removes an output of the flip-flop on a side close to a rear stage of two agreed flip-flops from a comparison object.

4. The bypass control circuit according to claim 1 wherein comparison processing by said first comparison means and comparison processing by said second comparison means are performed at the same timing.

5. The bypass control circuit according to claim 1, further comprising:

a register file for storing data corresponding to a plurality of types of source registers, respectively; and selection means for, when an output of said flip-flop agreeing with the register number of the source register of the instruction to be executed on the instruction bus is present as a result of the comparison processing by said first or second comparison means, setting said bypass path on the basis of the output, and when the output of said flip-flop agreeing with the register number of the source register of the instruction to be executed on the instruction bus is absent, reading a content of the source register of said instruction from said register file.

6. The bypass control circuit according to claim 1, further comprising:

a register file for outputting a content of the source register on the basis of the register number of the source register outputted from an instruction cache;

a first flip-flop for latching the content of the source register outputted from said register file;

a selection circuit connected to an output terminal of said first flip-flop; and a plurality of operation stage circuits cascade-connected to a rear stage of said selection circuit, said selection circuit selecting one from the output of said first flip-flop and outputs of said plurality of operation stage circuits on the basis of the comparison results of said first and second comparison means, and supplying the selected data to said operation stage circuit of a first stage.

7. The bypass control circuit according to claim 6 wherein the output of said operation stage circuit of a final stage is written back to a storage position in said register file corresponding to the instruction destination register number.

8. The bypass control circuit according to claim 6 wherein each of said plurality of operation stage circuits comprises an execution unit, and a flip-flop for latching an output of the execution unit.

9. The bypass control circuit according to claim 6 wherein said register file stores a plurality of types of source registers, and said selection circuit, said first comparison means, and said second comparison means are associated with said plurality of types of source registers, respectively.

10. A bypass control method of a processor comprising a plurality of flip-flops, cascade-connected on an instruction bus, for successively transferring a register number of a destination register indicating an instruction storage destination in synchronization with a system clock, said method comprising steps of:

comparing the outputs of at least two flip-flops of said plurality of flip-flops with each other;

comparing the register number of the source register of the instruction to be executed on the instruction bus with the outputs of at least part of said plurality of flip-flops; and setting a bypass path of data inputted to the source register of the instruction to be executed on the instruction bus on the basis of the comparison results of said respective comparing steps.

11. The bypass control method according to claim 10 wherein the step of setting said bypass path sets said bypass path on the basis of an output of the flip-flop on a side close to a first stage, when both of said comparing steps detect the agreement of two or more sets.

12. The bypass control method according to claim 11 wherein the step of setting said bypass path removes an output of the flip-flop on a side close to a rear stage of two agreed flip-flops from a comparison object, when said comparing step detects the agreement of at least two flip-flops.

13. The bypass control method according to claim 10 wherein comparison processings by said comparing steps are performed at the same timing.

14. The bypass control method according to claim 10, further comprising steps of, when an output of said flip-flop agreeing with the register number of the source register of the instruction to be executed on the instruction bus is present as a result of the comparison processing by both of said comparing steps, setting said bypass path on the basis of the output; and when the output of said flip-flop agreeing with the register number of the source register of the instruction to be executed on the instruction bus is absent, reading a content of the source register of said instruction from a register file.

* * * * *